April 1, 1952     H. P. PHILLIPS     2,591,004
CYLINDER BROACH
Filed Jan. 6, 1947     2 SHEETS—SHEET 1
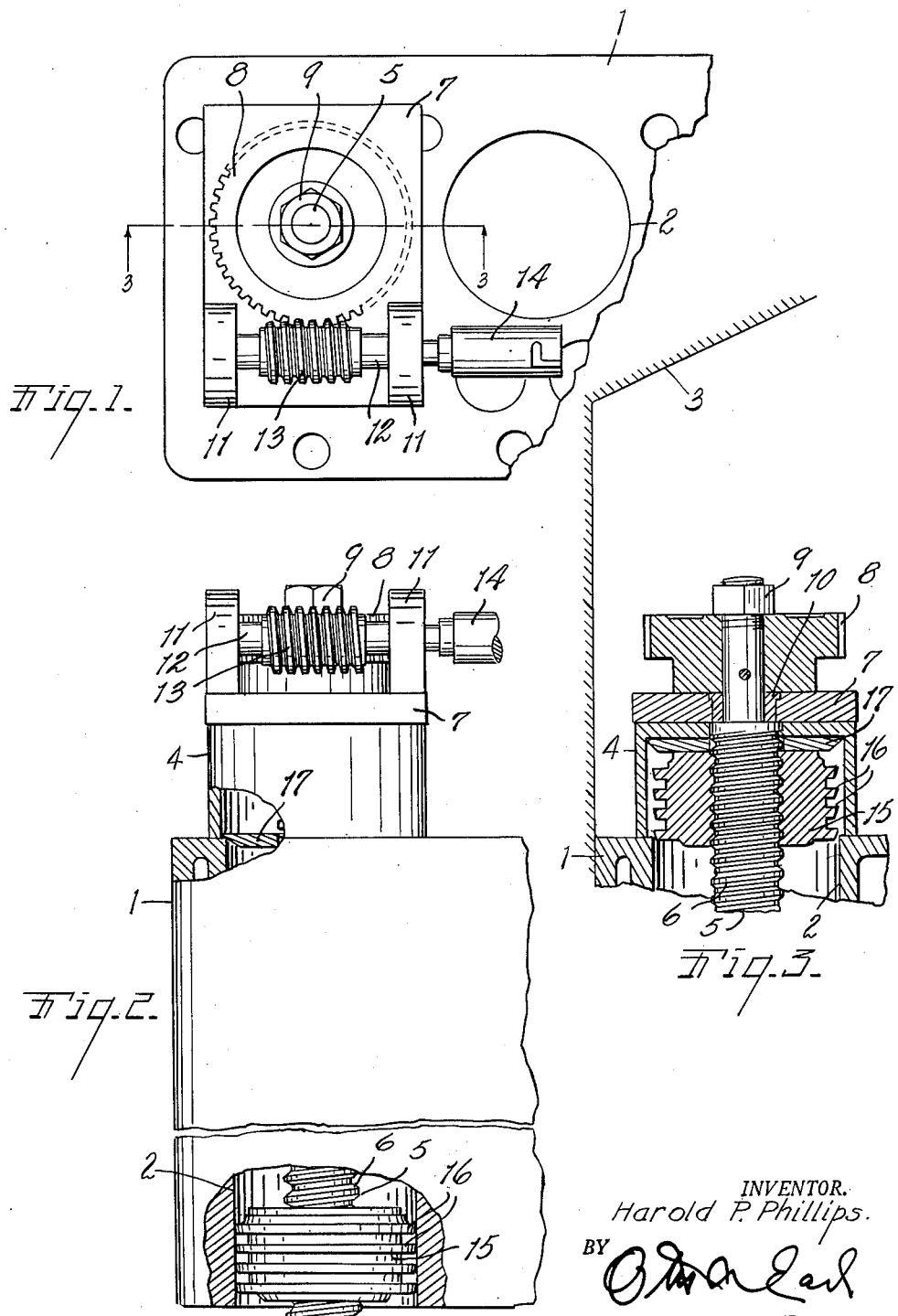
INVENTOR.
Harold P. Phillips.
BY
ATTORNEY.

April 1, 1952  H. P. PHILLIPS  2,591,004
CYLINDER BROACH
Filed Jan. 6, 1947  2 SHEETS—SHEET 2
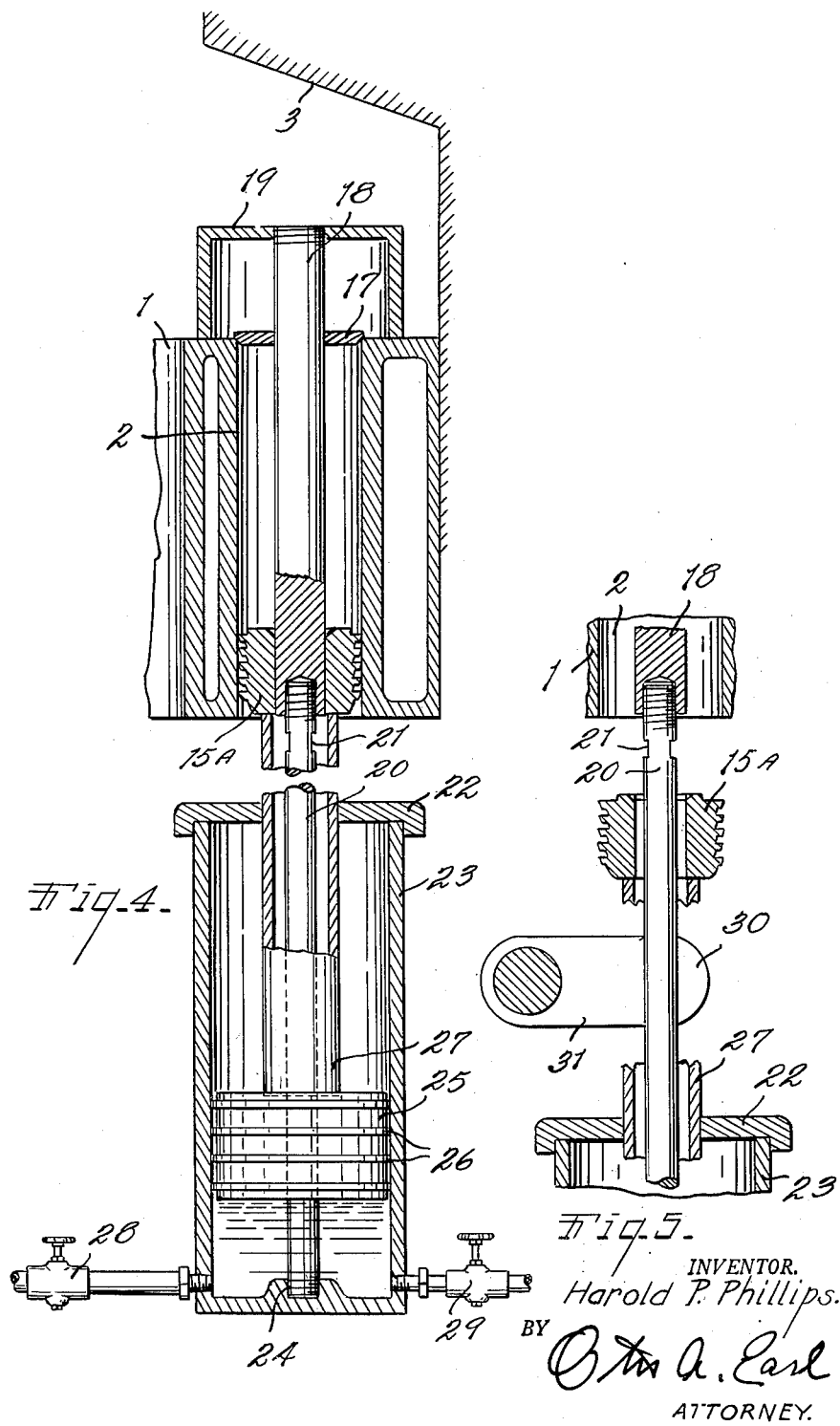

Patented Apr. 1, 1952

2,591,004

UNITED STATES PATENT OFFICE 2,591,004

CYLINDER BROACH

Harold P. Phillips, Hastings, Mich., assignor to Hastings Manufacturing Company, Hastings, Mich.

Application January 6, 1947, Serial No. 720,462

3 Claims. (Cl. 90—33)

This invention relates to improvements in a cylinder broach.

The principal objects of this invention are:

First, to provide a broach for refinishing the cylinder walls of an internal combustion engine which may be used while the engine is mounted in an automobile and without removing the crank shaft from the engine.

Second, to provide a broach for refinishing the cylinders of an automobile engine which can be used on all cylinders of the engine while the engine is installed in the body of the automobile regardless of overhanging body parts, particularly over the rear cylinder of the engine.

Third, to provide a power driven broach for refinishing the cylinders of an automobile engine to which power may be applied by a convenient power tool such as an electric drill applied horizontally over the top of the cylinder block.

Fourth, to provide a modified form of broach for refinishing the cylinders of an automobile engine in which power for operating the broach is supplied by a conveniently operated fluid pressure cylinder.

Fifth, to provide a self centering broach for refinishing the cylinder walls of an internal combustion engine which requires relatively little clearance at the ends of the cylinders for installation and operation.

Other objects and advantages pertaining to the details and economies of the invention will be apparent from the following description and claims.

The drawings, of which there are two sheets, illustrate a preferred and one modified form of my broach as applied to the engine of an automobile, certain of the parts of the automobile being illustrated conventionally.

Fig. 1 is a fragmentary plan view of the cylinder block of an automobile engine with my broach in operative position thereon.

Fig. 2 is a fragmentary side elevational view of the cylinder block and broach shown in Fig. 1, a portion of the cylinder block being broken away to illustrate the operation of the broach.

Fig. 3 is a fragmentary vertical longitudinal cross sectional view along the line 3—3 in Fig. 1.

Fig. 4 is a fragmentary vertical longitudinal cross sectional view through a modified form of cylinder broach in operative position in the rear cylinder of an automobile engine.

Fig. 5 is a fragmentary cross sectional view similar to Fig. 4 but illustrating the broach in partially installed position.

It is a common practice to refinish the cylinder bores of automobile engines after the cylinders have become worn by prolonged use by passing rotary hones or cutters through the cylinders to refinish the walls in true cylindrical shape. However, these refinishing tools are large and have considerable aligning and driving mechanism which must be located on top of the cylinder block which usually necessitates the removal of the cylinder block from the body of the automobile and the removal of the crank shaft from the cylinder block. This is particularly true in automobiles in which the rear cylinder is positioned underneath an over-hanging portion of the dash panel of the body. My tool is self centering and requires very little clearance over the top of the cylinder block for installation and the application of power to the broach. The broach is further operative without removing the crank shaft from the engine so that the refinishing operation may be easily accomplished without removing the crank shaft from the engine.

The drawings illustrate the cylinder block 1 of an automobile engine provided with the usual cylinders 2 and mounted in an automobile having an overhanging dash panel 3 which is positioned over the rear cylinder of the cylinder block. My refinishing tool consists of a downwardly opening cylindrical support 4 which is arranged to rest on the top of the cylinder block surrounding the upper end of the cylinder 2. The end wall of the support 4 is apertured to pass a guide bar 5 having screw threads 6 formed thereon. The guide bar 5 extends upwardly through a gear plate 7 secured to the end wall of the support. The bar is pin connected to a gear 8 clamped against axial movement on the bar by the nut 9. A bushing 10 is provided around the guide bar 5 where it passes through the gear plate.

The gear plate 7 is provided with a pair of upstanding ears 11 which are apertured to rotatably support a drive shaft 12 having a worm gear 13 thereon. The worm gear 13 is in driving engagement with the gear 8 on the end of the guide bar. The end of the drive shaft 12 is provided with a bayonet type coupling 14 for receiving the end of a driving tool such as an electric drill. The total height of the support and gear plate including the upper end of the guide bar 5 and the drive shaft 12 is relatively short permitting easy installation of the support below the overhanging portion 3 of the dash panel. The drive shaft 12 extends horizontally over the top of the cylinder block so that the driving tool may be applied thereto without interference from the overhanging dash panel. The support and gear plate are operative in any horizontal position relative to the axis of the cylinder so the drive shaft 12 may assume any convenient position for attachment of the power tool.

Positioned around the guide bar 5 and threadedly engaging the threads 6 is a broach 15 having a series of longitudinally spaced annular cutting edges 16 formed around the outside thereof. A centering disk 17 is positioned around the guide bar 5 between the top of the broach and the underside of the support member 4. The centering disk 17 is arranged to slide along the guide bar 5 and is provided with a beveled surface engageable with the upper end of the cylinder bore for centering the guide bar and the support 4 with respect to the walls of the cylinder 2.

The guide bar 5 and threads 6 are of such a length as to extend below the bottom of the cylinder bore 2, a distance equal to the length of the broach 15 permitting the broach to be screwed on the lower end of the guide by hand below the engine block. The guide bar 5 is passed downwardly through the cylinder bore 2 until the support 4 engages the top of the cylinder block and the centering disk 17 engages the upper end of the cylinder bore to center the guide bar and the support about the axis of the cylinder bore. The broach 15 is then threaded on the lower end of the guide bar 5 until its upper cutting edge 6 engages the bottom of the cylinder bore at which time the annular cutting edge will have a self-centering action in the cylinder bore so that the guide bar 5 is properly aligned in the cylinder bore by the centering disk 17 and the upper cutting edge of the broach 15. A power tool such as an electric drill may then be applied to the bayonet coupling 14 to rotate the drive shaft and worm gear which in turn drive the gear 8 and guide rod 5. The threaded connection between the threads 6 and broach 15 will cause the broach to be drawn upwardly through the cylinder bore making the required cut from the cylinder walls as it moves axially along the guide bar. Initially the broach 15 may be held against rotation with the guide bar by grasping the broach below the cylinder block. As the broach travels into the cylinder bore friction between the cutting edges 16 and the walls of the cylinder bore will prevent rotation of the broach so that rotation of the guide bar 5 causes simple axial motion of the broach through the cylinder bore. The cylindrical support 4 is of such height as to permit the broach 15 to be drawn completely into the support carrying the centering disk 17 with it as it approaches the top of its travel. (See Fig. 3.)

The axially spaced cutting edges 16 form a self-aligning engagement with the walls of the cylinder bore and the centering disk 17 maintains the upper end of the guide bar centered in the cylinder bore until the final movement of the broach out of the cylinder bore. Thus the tool may be easily used on any of the cylinders of the cylinder block including the rear cylinder underneath the overhanging portion of the dash panel. Broaches of different diameter will of course be used depending on the diameter of cylinder being broached.

A modified form of broach illustrated in Figs. 4 and 5 is provided with a sectional guide bar having an upper section 18 threadedly connected with the end wall of the downwardly opening cylindrical support 19 which is engageable with the top of the cylinder block 1. The lower end of the upper section 18 is provided with a tapped aperture for receiving the threaded upper end of the lower section 20 of the guide bar. The lower section is flattened as at 21 so that a wrench may be easily applied thereto for clamping the two sections of the guide bar together. The lower section 20 extends downwardly through the cover plate 22 of a fluid pressure cylinder 23 and is threadedly connected to the bottom wall of the cylinder as at 24.

The pressure cylinder 23 is provided with a piston 25 sealed to the walls of the cylinder by piston rings 26 and bearing against the lower end of a tubular ram 27 which extends upwardly through the cover plate 22 and around the lower section 20 of the guide bar. The upper end of the ram 27 is arranged to bear against the bottom of the broach 15A which is the same as in the preferred form of cylinder broach except for a smooth central bore. A centering disk 17 is provided around the upper section 18 of the guide bar as in the first form of the invention.

The lower end of the pressure cylinder 23 is provided with a fluid inlet controlled by the valve 28 and an outlet controlled by the valve 29 so that fluid under pressure form a suitable pump, not shown, may be admitted to the cylinder to raise the piston 25 and the ram 27. As in the first form of the invention the centering disk 17 will center the upper end of the guide bar in the cylinder bore and the broach 15 will function to center the guide bar in the lower end of the cylinder bore. In attaching the tool in the cylinder of an automobile engine, the upper section 18 of the guide bar is secured to the support 19 and passed downwardly through the cylinder bore with the centering disk 17 positioned around the guide bar and engaging the upper end of the cylinder bore. The lower section 20 of the guide bar may then be grasped and held below the cylinder block as indicated at Fig. 5 and inserted into the tapped aperture in the end of the upper section and tightened by application of a wrench to the flattened portion 21. The broach 15 is conveniently supported around the lower section 20 by the operator's hand while this connection is being made.

It will be noted from Fig. 5 that the lower section 20 of the guide bar is of sufficient length so that the pressure cylinder 23 will hang below the crank shaft 30 of the engine with the guide rod extending between the crank throws 31 of the crank pin 32 associated with the cylinder to be broached. Fluid may then be admitted to the cylinder to raise the piston and ram as previously described to force the broach through the cylinder. Obviously the pressure cylinder must be long enough to provide a length of travel of the piston equal to the length of the cylinder wall being broached plus the distance of the pressure cylinder below the cylinder bore.

As in the first form of the invention the hydraulically operated broach may be easily and quickly applied to any of the cylinders of an automobile engine without removing the cylinder block from the automobile and without removing the crank shaft from the cylinder block. Power for operating the pressure cylinder is conveniently supplied to the cylinder by a pump and flexible conduit, not shown. The time and cost of refinishing the cylinder bores of the engine is thus greatly reduced.

I have described two highly practical forms of my cylinder broach so that others may reproduce and operate the same without further description.

Having thus described my invention, what I claim as new and desire to secure by Letters Patent, is:

1. A tool for surfacing a cylinder bore of an engine comprising a chambered support member adapted to seat against an engine around a cylinder bore and having an inwardly facing recess therein of a diameter exceeding that of the cylinder bore, a guide on said support adapted to be positioned centrally through the cylinder bore, a centering disk slidable on said guide and engageable within the bore adjacent the support to center the guide therein, and a broach translatable along said guide and into said recess in said support.

2. A broaching tool for a cylinder bore of an engine comprising an arched support member adapted to be seated upon the engine at one end of the cylinder bore thereof, a centering guide on said support adapted to be positioned centrally through the cylinder bore, a centering member slidable on said guide and adapted to seat in the end of the cylinder bore adjacent said support, and a broach having an annular surfacing edge translatable along said guide and through said bore.

3. A broaching tool for a cylinder bore of an engine comprising a support member adapted to seat on the engine at one end of the cylinder bore, a guide on said support adapted to receive a broach to be passed through the bore, a centering member on said guide and engageable with the bore to center the guide therein, and a broach translatable along said guide.

HAROLD P. PHILLIPS.

REFERENCES CITED

The following references are of record in the file of this patent:

UNITED STATES PATENTS

| Number | Name | Date |
|---|---|---|
| Re. 15,916 | Flinchbaugh | Sept. 16, 1924 |
| 136,338 | Sanford | Feb. 25, 1873 |
| 200,071 | Love | Feb. 5, 1878 |
| 576,291 | Uhelacker | Feb. 2, 1897 |
| 916,134 | Fischback | Mar. 23, 1909 |
| 1,394,079 | Fuchs | Oct. 18, 1921 |
| 1,434,711 | La Pointe | Nov. 7, 1922 |
| 2,320,750 | Raiche | June 1, 1943 |